United States Patent
Hara et al.

[11] Patent Number: 5,944,632
[45] Date of Patent: Aug. 31, 1999

[54] ELECTRIC OIL PUMP CONTROL SYSTEM FOR VEHICULAR POWER TRANSMISSION

[75] Inventors: Takeshi Hara; Kiyoshi Kurita, both of Anjo, Japan

[73] Assignee: Aisin AW Co., Ltd., Anjo, Japan

[21] Appl. No.: 08/917,681

[22] Filed: Aug. 26, 1997

[30] Foreign Application Priority Data

Sep. 11, 1996 [JP] Japan .................................. 8-261148

[51] Int. Cl.⁶ .................................................. F16H 57/00
[52] U.S. Cl. .............................. 477/158; 477/90; 477/156
[58] Field of Search ................................ 477/90, 96, 97, 477/107, 109, 156, 158; 184/6.12

[56] References Cited

U.S. PATENT DOCUMENTS

| 5,168,975 | 12/1992 | Bernhardt et al. | 477/90 X |
| 5,372,213 | 12/1994 | Hasebe et al. | 180/65.6 |
| 5,681,238 | 10/1997 | Minowa et al. | 477/107 X |

FOREIGN PATENT DOCUMENTS

| A-6-174055 | 6/1994 | Japan . |
| A-6-193711 | 7/1994 | Japan . |
| A-7-167261 | 7/1995 | Japan . |

*Primary Examiner*—Khoi Q. Ta
*Attorney, Agent, or Firm*—Oliff & Berridge, PLC

[57] ABSTRACT

A vehicular power transmission includes an oil pump that produces an oil pressure for a line pressure to control the applications of frictional engagement elements and for a lubrication pressure to lubricate individual mechanical portions of the transmission. A motor is provided for driving the oil pump. A control unit controls the motor. An electric oil pump control system includes an accelerator sensor for inputting acceleration data according to the operation of the accelerator pedal of a vehicle to the control unit. The control unit controls the revolutions per minute of the motor such that the amount of oil discharged by the oil pump is sufficient for outputting the line pressure matching the acceleration data and the lubrication pressure.

8 Claims, 10 Drawing Sheets

|   |   | E/G | M/G | CF | CD |
|---|---|---|---|---|---|
| D | Motor Run | ○(idle) | M | × | ○ |
|   | Sprit Run | ○ | G→M | ○ | × |
|   | PH Run | ○ | M or G | ○ | ○ |
|   | E/G Run | ○ | × | ○ | ○ |
|   | Regeneration | ○(idle) | G | × | ○ |
| R |   | ○ | G→M | ○ | × |

FIG. 3

|   |   | C0 | C1 | C2 | B0 | B1 | B2 | B3 | F0 | F1 | F2 |
|---|---|---|---|---|---|---|---|---|---|---|---|
| P, N |   | × | × | × | × | × | × | × | × | × | × |
| R |   | ○ | × | ○ | × | × | × | ○ | ○ | × | × |
| D | 1ST Speed | ○ | ○ | × | × | × | × | (○) | ○ | × | ○ |
|   | 2ND Speed | ○ | ○ | × | × | (○) | ○ | × | ○ | ○ | × |
|   | 3RD Speed | ○ | ○ | ○ | × | × | ○ | × | ○ | × | × |
|   | 4TH Speed | × | ○ | ○ | ○ | × | ○ | × | × | × | × |

ELECTRIC OIL PUMP CONTROL SYSTEM FOR VEHICULAR POWER TRANSMISSION

BACKGROUND OF THE INVENTION

1. Field of the Invention

The invention relates to a control system for an oil pump constituting the oil pressure source of a vehicular power transmission and, more particularly, to a control of a motor for driving the oil pump.

2. Description of Related Art

In a vehicular drive unit, there is a hybrid type drive unit in which an internal combustion engine (hereafter "engine") and an electric motor (hereafter "motor") are combined as a power source. In order to reduce the drive load on the oil pump of an automatic transmission during power transmission, there is disclosed a technique in which the oil pump is driven by switching the engine and the motor, as disclosed in Japanese Patent Laid-Open No. 174055/1994. In this technique, the oil pump is small-sized to reduce the sliding area and thereby to lighten the drive load. In order to compensate for the shortage of the amount of oil discharged per rotation due to the small size by increasing the number of revolutions, the oil pump is basically driven at a high RPM by the engine. At the time of a neutral-drive (N-D) shift in which the RPM of the engine is so low that the oil discharge amount is insufficient, the oil pump is driven at a high RPM by the motor to retain the desired oil discharge amount. At a vehicular stop time when a non-running range, e.g., a "P" range or "N" range requiring no oil is selected or when the oil is required but the engine RPM is high, a sufficient oil amount can be retained by the engine drive alone so that the power consumption is reduced by stopping the rotation of the motor.

Thus according to the aforementioned structure of the prior art, the oil pump and the motor for driving the oil pump can be small-sized so that the structure seems to reduce the power consumption effectively. However, this structure switches the drive of the oil pump by a mechanical switch mechanism and accordingly requires gear clutches for connecting the engine and the motor to the oil pump and one-way clutches for smoothing the switching operations. This structure makes it necessary to enlarge the size of the system in its entirety. Moreover, the aforementioned prior art is based upon the drive of the oil pump by the engine so that it cannot be adopted for power transmission in which both the engine and the motor are stopped when the vehicle stops so as to further reduce the mileage and the power consumption. If, however, the oil pump is driven at all times by the dedicated motor, the power consumption becomes too high to achieve the desired reduction in power consumption.

Figure 13:
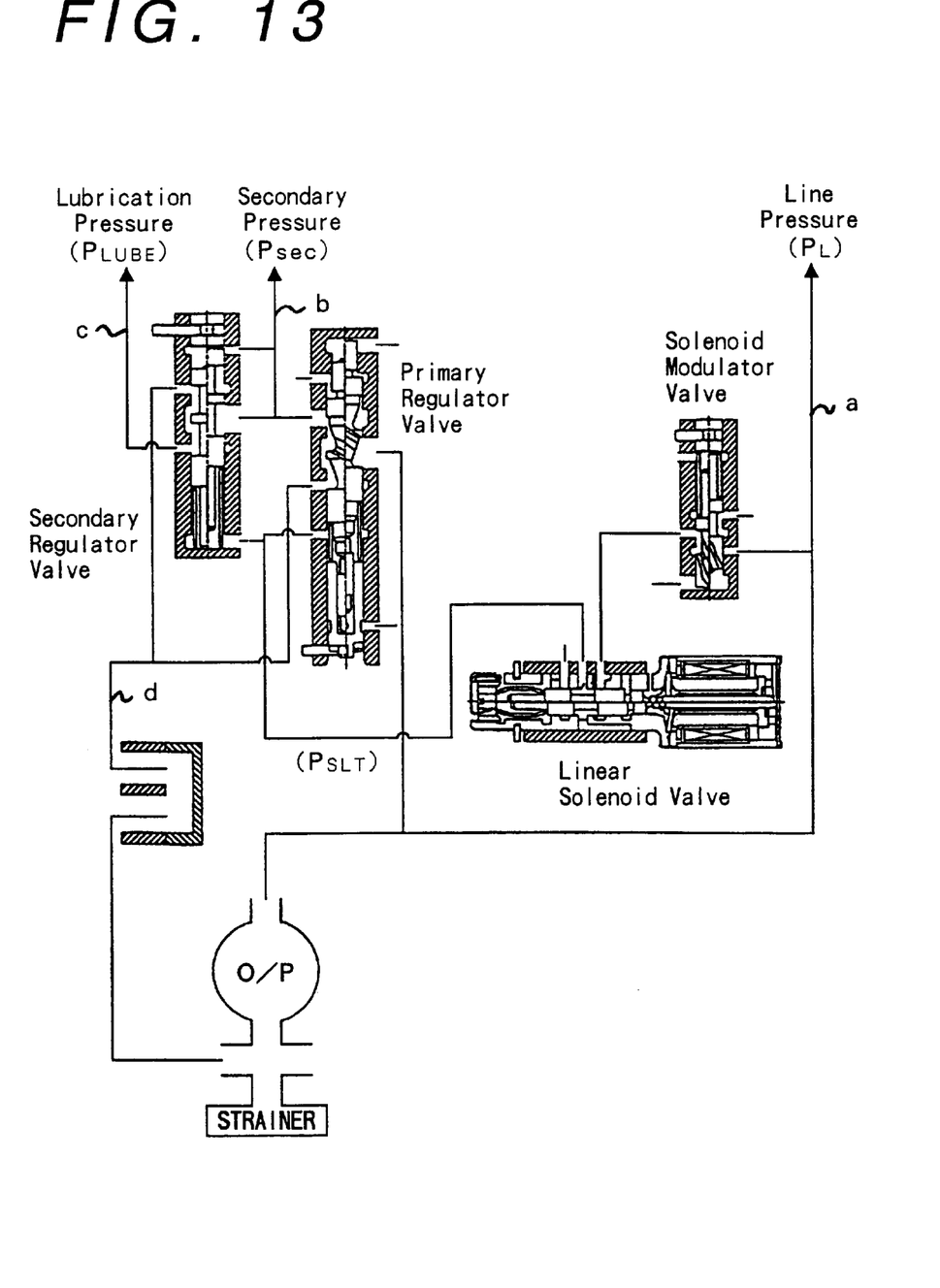
FIG. 13 is a partial circuit diagram showing an oil pump and a pressure regulating circuit portion of the automatic transmission of the prior art.

In the case of the ordinary automatic transmission of the prior art, the oil pressure includes as required: a line pressure for controlling the applications of frictional engagement elements such as clutches or brakes; a secondary pressure for actuating a torque converter, if provided; and a lubrication pressure for cooling the frictional engagement elements and gears and for lubricating the individual mechanical portions. FIG. 13 shows a general pressure regulating circuit portion for establishing those individual oil pressures in the valve body of the automatic transmission. A line pressure oil passage (a) is connected to the discharge side of an oil pump (O/P) and leads to a shift control circuit for controlling the oil pressure to hydraulic servos of the individual frictional engagement elements. A line pressure ($P_L$) of the line pressure oil passage (a) is regulated by a primary regulator valve which is connected to a branch of the line pressure oil passage (a) to output a secondary pressure ($P_{sec}$) properly while regulating the line pressure and to drain the excess pressure to the suction side of the oil pump (O/P). A secondary pressure oil passage (b) is connected to the output side of the primary regulator valve and leads to the torque converter. The secondary pressure ($P_{sec}$) of the secondary pressure oil passage (b) is regulated by a secondary regulator valve which is connected to a branch of the oil passage (b) to output a lubrication pressure ($P_{LUBE}$) properly while regulating the secondary pressure ($P_{sec}$) and to drain the excess pressure to the suction side of the oil pump. In addition, the lubrication pressure ($P_{LUBE}$) of a lubrication pressure oil passage (c), which is connected to the output side of the secondary regulator valve and leads to the individual mechanical portions, is the output oil pressure of the aforementioned secondary regulator valve. The regulator valves are controlled by a linear solenoid valve for outputting a throttle signal pressure ($P_{SLT}$) in accordance with throttle opening data, as applied to a solenoid.

In the pressure regulating circuit thus structured, as the discharge oil amount of the oil pump (O/P) grows higher than the oil amount to be drained and consumed in a shift control circuit, the line pressure ($P_L$) rises. After the line pressure ($P_L$) reaches a predetermined line pressure ($P_L$), the excess pressure is outputted as the secondary pressure ($P_{sec}$) to the secondary pressure oil passage (b). As the discharge oil amount of the oil pump (O/P) likewise grows higher than the oil amount to be consumed by the circuit leading to the secondary pressure oil passage (b), the excess pressure to pass through the secondary regulator valve is outputted as the lubrication pressure ($P_{LUBE}$) to the lubrication pressure oil passage (c), and the more excess oil pressure is returned from a drain oil passage (d) to the suction side of the oil pump (O/P). As a result, the oil pump driving force, as consumed for discharging the oil drained, is an energy loss. In addition, the oil to be outputted to the lubrication pressure oil passage (c) is also an energy loss when the individual mechanical portions are in a load state requiring no special supply of the lubricating oil.

Figure 14:
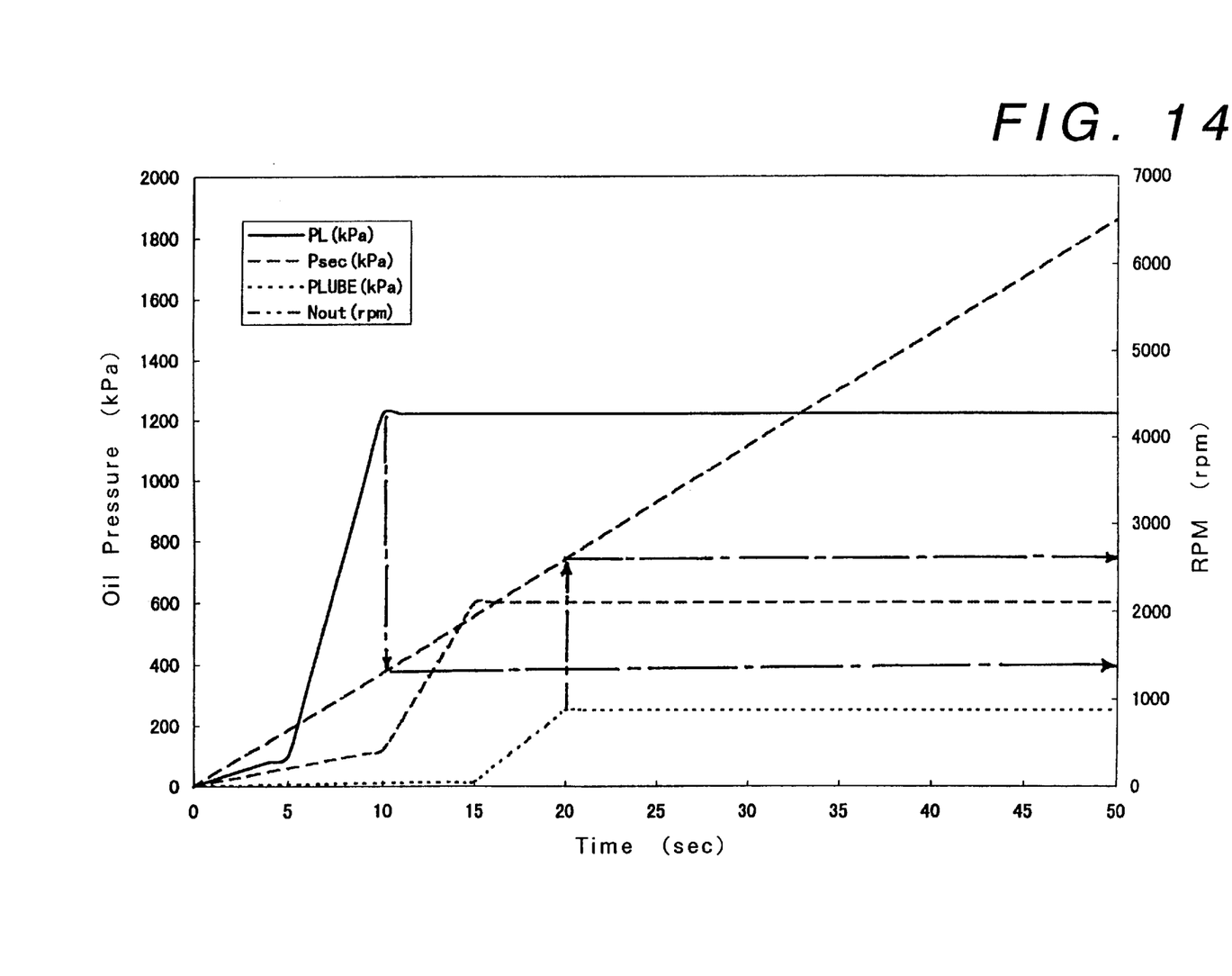
FIG. 14 is a hydraulic characteristic diagram of the automatic transmission of the prior art.

FIG. 14 illustrates one example of the relationship between the rises in the aforementioned individual oil pressures at a full throttle time at a first speed of the ordinary automatic transmission and the rises in the oil pump RPM. The line pressure ($P_L$) takes a predetermined value, as indicated by a solid curve of the drawing, when the oil pump RPM (i.e., the engine RPM) is about 1,400 rpm. The lubrication pressure ($P_{LUBE}$) takes a predetermined value, as indicated by a dotted curve, when the oil pump RPM is about 2,600 rpm. In this case, the discharge flow corresponding to the RPM of the oil pump exceeding the aforementioned value of 2,600 rpm is wholly drained with resultant energy loss. Although not covered by the condition of this drawing, in addition, if the running condition should require no lubrication pressure, the energy loss could be drastically reduced by regulating the upper limit of the RPM of the oil pump to about 1,400 rpm.

SUMMARY OF THE INVENTION

It is, therefore, a first object of the invention to provide an electric oil pump control system for a vehicular power transmission in which an electric motor drives an oil pump at all times without any switching mechanism and the control system can reduce the power consumption and retain the necessary discharge oil amount according to the drive situation.

During coasting (when the prime mover is driven by an inertial force), the load to be applied to the individual components of the power transmission is low. The power transmission is structured as an automatic transmission, and the lubricating oil amount need not be retained during coasting, unlike during drive time, even though the frictional engagement elements are applied for achieving engine braking. Therefore, a second object of the invention is to lighten the oil pump drive load during coasting to thereby further reduce the power consumption.

If the vehicle speed is high even during the aforementioned coasting, the rotation of the internal mechanism of the power transmission is high, and the load to be applied to the individual mechanical portions is higher than that at a low speed time. Therefore, a third object of the invention is to avoid shortage of the lubricating oil amount under such drive situations.

At a drive time, the vehicle speed is generally low during operation in reverse, and the time during reverse operation is also short so that the lubricating oil amount required during the drive state for a forward run need not be retained. In this case, even if the power transmission is an automatic transmission and the frictional engagement elements are applied for establishing the reverse stage, the lubricating oil amount required during the forward run need not be retained. Therefore, a fourth object of the invention is to lighten the oil pump drive load during reverse operation, thereby further reducing the power consumption.

When the vehicle speed is high even during the aforementioned reverse operation, the rotation of the internal mechanism of the power transmission is high, and the load to be applied to the individual mechanical portions is higher than at the low speed time. Therefore, a fifth object of the invention is to avoid shortage of the lubricating oil amount under such drive situations.

At a stop time when the shift position of the power transmission is in the running range, not only the rotation of but also the load on the internal mechanism of the power transmission is low. However, the possibility for starting the vehicle run quickly is so high as to require a high line pressure for controlling the applications of the frictional engagement elements of the power transmission at the time of shifting to a starting acceleration. Therefore, a sixth object of the invention is to retain the desired line pressure under this situation to prevent the slow start of the vehicle.

At a stop in a non-running range, both the rotation of and the load on the internal mechanism of the power transmission are so low as to make it sufficient to prepare for the starting acceleration by awaiting the shift to the running range. Therefore, a seventh object of the invention is to lighten the oil pump drive load during the non-running range to the minimum to further reduce the power consumption.

Next, at the initial running start time of the vehicle independently of the aforementioned shift position, the working oil temperature of the power transmission is low, and the oil has a poor fluidity so that the lubricating oil does not sufficiently lubricate the individual mechanical portions. It is, therefore, necessary to regain the lubricated state of the individual portions quickly. After the working oil temperature reaches a proper temperature, the regaining of the proper lubricating oil amount is not as difficult as that at the initial time. Therefore, an eighth object of the invention is to avoid a shortage of the lubricating oil amount, as accompanying the reduction in the power consumption, by driving the oil pump in accordance with the temperature of the working oil and the lubricated situation of the individual mechanical portions.

More generally speaking, the fluidity of the working oil changes according to the oil temperature. Therefore, a ninth object of the invention is to avoid a shortage of the lubricating oil amount, as accompanying the reduction in the power consumption, even under a more general situation by driving the oil pump while considering the fluidity of the working oil.

In order to achieve the aforementioned first object, a vehicular power transmission is provided comprising: an oil pump that acts as an oil pressure source for a line pressure to control the applications of frictional engagement elements and for a lubrication pressure to lubricate individual mechanical portions; a motor for driving the oil pump; and a control unit for the motor. An electric oil pump control system is provided comprising an accelerator sensor for inputting acceleration data according to the operation of the accelerator pedal of a vehicle to the control unit, wherein the control unit controls the RPM of the motor such that the amount of oil discharged by the oil pump is sufficient for outputting a line pressure matching the acceleration data and the lubrication pressure. The amount of oil to be discharged must take into consideration the leakage of the oil from the individual portions, and this factor is considered when the RPM of the motor is set.

In order to achieve the aforementioned second object, the control unit determines the coast state of the vehicle from the acceleration data to control the RPM of the motor so that the amount of oil discharged from the oil pump is only sufficient for outputting the line pressure and not the lubrication pressure.

In order to achieve the aforementioned third object, the electric oil pump control system further comprises a vehicle speed sensor for inputting the running speed of the vehicle to the control unit, and the control unit controls the RPM of the motor during coasting at a high vehicle speed, so that the amount of oil discharged from the oil pump is sufficient for outputting the line pressure and the lubrication pressure.

In order to achieve the aforementioned fourth object, the electric oil pump control system further comprises a shift position sensor for inputting the range position of the power transmission to the control unit, and the control unit controls the RPM of the motor, when the range position is reverse, so that the amount of oil discharged from the oil pump is only sufficient for supplying the line pressure matching the acceleration data.

In order to achieve the aforementioned fifth object, the electric oil pump control system further comprises a vehicle speed sensor for inputting the running speed of the vehicle to the control unit. The control unit controls the RPM of the motor, during reverse operation at a high vehicle speed, so that the amount of oil to be discharged from the oil pump is sufficient for outputting the line pressure matching the acceleration data and the lubrication pressure.

In order to achieve the aforementioned sixth object, the electric oil pump control system further comprises a shift position sensor for inputting the range position of the power transmission to the control unit. The control unit controls the RPM of the motor, during a stop in the running range, irrespective of the value of the acceleration data inputted, so that the amount of oil discharged from the oil pump is only sufficient for supplying a line pressure to prevent a slow start of the vehicle.

In order to achieve the aforementioned seventh object, the electric oil pump control system further comprises: a shift position sensor for inputting the range position of the power transmission to the control unit; and a vehicle speed sensor for inputting the running speed of the vehicle. The control unit controls the RPM of the motor, during a stop in a non-running range, irrespective of the value of the acceleration data inputted, so that the amount of oil discharged from the oil pump is sufficient for supplying a line pressure to allow shifting to a running range in preparation for starting acceleration.

In order to achieve the aforementioned eighth object, the electric oil pump control system further comprises: an ignition switch for inputting the ON/OFF data of a power source circuit of the vehicle to the control unit; and an oil temperature sensor for inputting the temperature of the oil in the power transmission to the control unit. The control unit rotates the motor at a high speed, when the ignition switch is turned ON, for a predetermined time period according to the oil temperature and lowers the RPM of the motor gradually, while awaiting the lapse of a predetermined time, to a value capable of outputting the line pressure matching the acceleration data.

In order to achieve the aforementioned ninth object, the electric oil pump control system further comprises an oil temperature sensor for inputting the temperature of the oil in the power transmission to the control unit, and the control unit changes the RPM of the motor in accordance with the oil temperature.

The RPM of the motor for driving the oil pump in an embodiment of the invention is controlled such that the amount of oil to be discharged by the oil pump takes a value capable of outputting a line pressure matching the acceleration data and the lubrication pressure, such that the outputs of the line pressure and the lubrication pressure can be reliably achieved. With this motor RPM, the amount of oil discharged from the oil pump is entirely used as the line pressure and the lubrication pressure so that the motor is not used inefficiently and the power consumption is reduced.

In an embodiment of the invention, during a coast time requiring no lubrication oil, the discharge oil amount is set to achieve only the output of the line pressure necessary for the application of the frictional engagement elements during engine braking, thus allowing lightening of the oil pump drive load upon the motor.

In an embodiment wherein even at the coast time a high vehicle speed is maintained with high speed rotation of the internal mechanism of the power transmission, the load to be applied to the individual mechanical portions grows higher than at a low speed. The potential shortage of the amount of the lubricating oil can be avoided by producing an output of lubrication pressure sufficient for the cooling and lubricating operations.

During reverse operation, the motor RPM is set to a value capable of outputting only the line pressure matching the acceleration data so that the power consumption can be reduced while maintaining the applications of the frictional engagement elements for establishing reverse mode.

During reverse operation at a high vehicle speed, the individual mechanical portions can be cooled and lubricated by producing sufficient line pressure for the output of lubrication pressure as well.

An output of line pressure can also be set in preparation for sudden acceleration of the vehicle so that a delay in the start of acceleration can be prevented by the quick applications of the frictional engagement elements. In addition, no lubrication pressure is outputted so that the power consumption can be accordingly reduced.

In another embodiment, a standby mode is assumed for the shift to a running range while maintaining the output of a line pressure at a level to cause a creep of the vehicle so that the power consumption can be reduced.

Immediately after ignition, a sufficient lubrication pressure can be outputted for a predetermined time period according to the oil temperature of the power transmission so that the lubricating oil can be promptly fed to the power transmission as a whole. After the lapse of the predetermined time period, a standby mode can be assumed in preparation for the shift to a running range while maintaining the output of a line pressure at a level to cause a creep of the vehicle.

The outputs of the necessary line pressure and lubrication pressure can be set in response to a change in the fluidity due to the viscous resistance of the oil.

BRIEF DESCRIPTION OF THE DRAWINGS

The invention will be described with reference to the drawings in which.

DESCRIPTION OF THE PREFERRED EMBODIMENT

Figure 1:
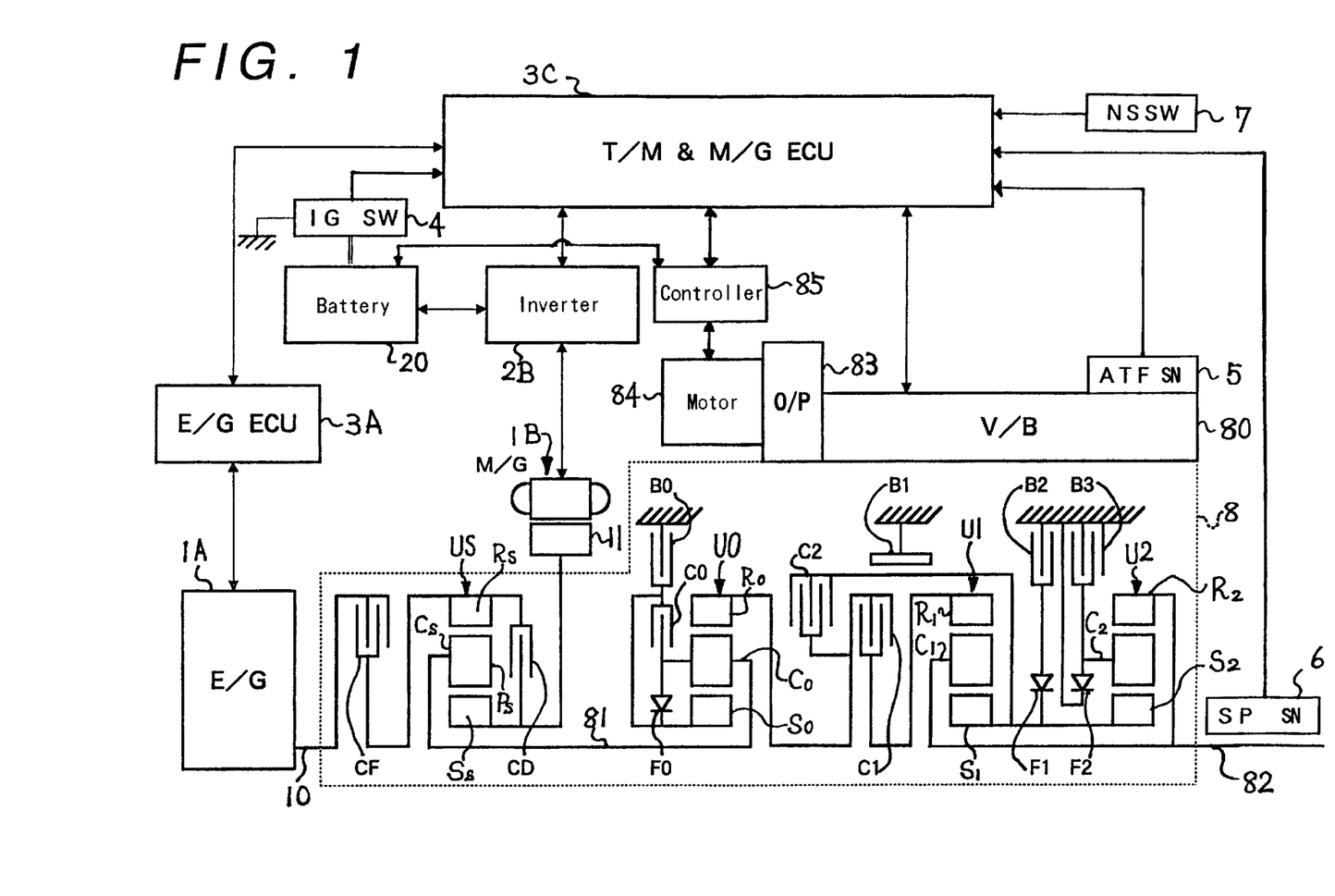
FIG. 1 is a block diagram showing the entire system structure of a vehicular drive unit comprising a power transmission according to one embodiment of the invention with the power train portion in schematic.

An embodiment of the invention will be described with reference to the accompanying drawings. FIG. 1 shows an entire structure of a hybrid type vehicular drive unit which uses an engine and a motor generator as a power source, and a mechanism portion of a power transmission in schematic form. This drive unit is structured to comprise: an engine (E/G) 1A and a permanent magnet synchronous motor type motor generator (M/G) 1B as its power source; an engine control computer (E/G) 3A as control means for the engine 1A; an inverter 2B powered by a battery 20 as drive means of the motor generator 1B; an automatic transmission 8 having a power split unit as its power transmission; and a transmission & motor generator control computer (T/M&M/G-ECU) 3C as its control system.

The automatic transmission 8 is equipped with a valve body (V/B) 80 having a hydraulic circuit for its control, and an oil pump (O/P) 83, as arranged in a suitable position of the automatic transmission 8, can be driven by a motor 84 dedicated thereto. Motor 84 is driven by a controller 85 dedicated thereto. The transmission & motor generator control computer 3C can receive a throttle opening as accelerator data from the engine control computer 3A and is so connected with the inverter 2B as to exchange data for controlling the motor generator 1B and with the valve body 80 as to output data for controlling the individual solenoid valves (although not shown) thereof. The control system is equipped with: an ignition switch (IG-SW) 4; an oil temperature sensor (ATF-SN) 5 for detecting the working oil temperature of the power transmission; a vehicle speed sensor (SP-SN) 6 for detecting the vehicle speed from the rotations of an output shaft 82 of the automatic transmission 8; and a shift position sensor (NSSW) 7 for detecting the position of a shift lever to control the power transmission, in terms of the displacement of a shift link.

As shown in the drawing, the automatic transmission 8 establishes a plurality of gear stages by applying/releasing clutches C0 to C2 and brakes B0 to B3. Automatic transmission 8 has a four-speed structure including two planetary gear units U1 and U2. Transmission 8 has three forward and one reverse stages, with a planetary gear unit U0 composing an overdrive mechanism. A carrier $C_0$ and a sun gear $S_0$ of the planetary gear unit U0, as connected to an input shaft 81, are connected to the clutch C0, as arranged in parallel, through a one-way clutch F0, and the sun gear $S_0$ can be retained relative to the transmission housing by the brake B0. A ring gear $R_0$, is an output element of the planetary gear unit U0 and is connected through the clutches C1 and C2, as arranged in parallel, with a ring gear $R_1$ and a sun gear $S_1$ of the planetary gear unit U1. A sun gear $S_2$ and a ring gear $R_2$ of the planetary gear unit U2 are connected to the sun gear $S_1$ and a carrier $C_1$ of the planetary gear unit U1, respectively, and the ring gear $R_2$ is connected to the output shaft 82 as the output element of the automatic transmission 8. The aforementioned sun gears $S_1$ and $S_2$ can be retained relative to the transmission housing by the brake B1 and a one-way clutch F1 in series with the brake B2, and a carrier $C_2$ of the planetary gear unit U2 can be retained by a one-way clutch F2 in parallel with the brake B3.

The automatic transmission 8, the engine 1A and the motor generator 1B are connected to one another through the power split unit. This power split unit is equipped with a planetary gear unit US which is connected to the engine 1A through a forward clutch CF and connected to the motor generator 1B and the transmission 8. The planetary gear unit US includes a ring gear $R_s$, a sun gear $S_s$, and a carrier $C_s$ of a pinion gear $P_s$ meshing with the two gears $R_s$ and $S_s$. The ring gear $R_s$ is connected through the forward clutch CF to an output shaft 10 of the engine 1A. The sun gear $S_s$ is connected to a rotor 11 of the motor generator 1B. The carrier $C_s$ is connected to the input shaft 81 of the automatic transmission 8. A direct clutch CD for connecting and disconnecting the ring gear $R_s$ and the sun gear $S_s$ to and from each other is provided so that the planetary gear unit US can be rotated either directly or in a planetary rotation.

The control system for controlling the drive unit thus structured, mainly comprises the transmission & motor generator control computer 3C for controlling the motor generator 1B through the inverter 2B and the individual clutches and brakes of the automatic transmission 8 having the power split unit through the not-shown hydraulic circuit in the valve body, and further comprises: the battery 20 for storing the energy, as recovered from the motor generator 1B, as an electric power and for feeding an electric power for driving the motor generator 1B; the aforementioned inverter 2B constituting control means of the motor generator 1B; the aforementioned hydraulic circuit constituting control means of the automatic transmission 8; and the engine control computer 3A constituting control means of the engine 1A for exchanging data with the transmission & motor generator control computer 3C.

Figure 2:
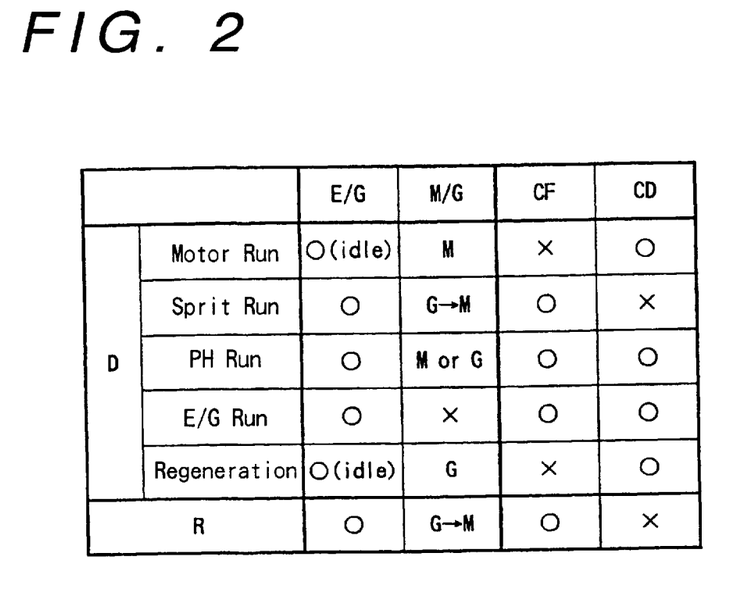
FIG. 2 is a diagram of the operations and applications of the vehicular drive unit of the aforementioned embodiment.

The engine 1A, the motor generator 1B and the power split unit of the vehicular drive unit thus structured basically operates in five different modes, as tabulated in the operation diagram of FIG. 2. Specifically, at the running time in a motor mode, the forward clutch CF is released (X), and the direct clutch CD is applied (O), so that the engine (E/G) 1A is controlled to an idling (idle) rotation whereas the motor generator (M/G) 1B works as a motor (M). At this time, the output torque of the motor generator 1B is transmitted to the transmission 8 through the planetary gear unit US in a directly coupled state.

At the running time in a split mode, the forward clutch CF is applied (O), and the direct clutch CD is released (X), so that the engine 1A is kept at a predetermined rotation whereas the motor generator (M/G) 1B is shifted according to the rise in the vehicle speed from the generator (G) to the motor (M). The engine output torque is inputted through the forward clutch CF to the ring gear $R_s$ of the planetary gear unit US so that the output torque according to the reaction torque support of the sun gear $S_s$ by the motor generator 1B is outputted from the carrier $C_s$ to the transmission 8.

At the running time in a parallel hybrid (PH) mode, both the forward clutch CF and the direct clutch CD are applied (O), so that the motor generator (M/G) 1B works as the generator (G) or the motor (M). At this time, the engine output torque is outputted through the forward clutch CF and the directly coupled planetary gear unit US to the transmission, and the output torque of the motor generator 1B is outputted through the directly coupled planetary gear unit US to the transmission B.

At the running time in the engine (E/G) mode, both the forward clutch CF and the direct clutch CD are applied (O). The output torque of the engine 1A is outputted through the forward clutch CF and the planetary gear unit US to the transmission 8.

At the running time in the regeneration mode, the forward clutch CF is released (X), and the direct clutch CD is applied (O), so that motor generator (M/G) 1B works as the generator (G). The inverse drive torque, as transmitted from the wheels through the transmission 8 to the planetary gear unit US in the directly coupled state, is utilized as the braking force of the vehicle in accordance with the torque control of the motor generator 1B in the power generating control state.

Figure 3:
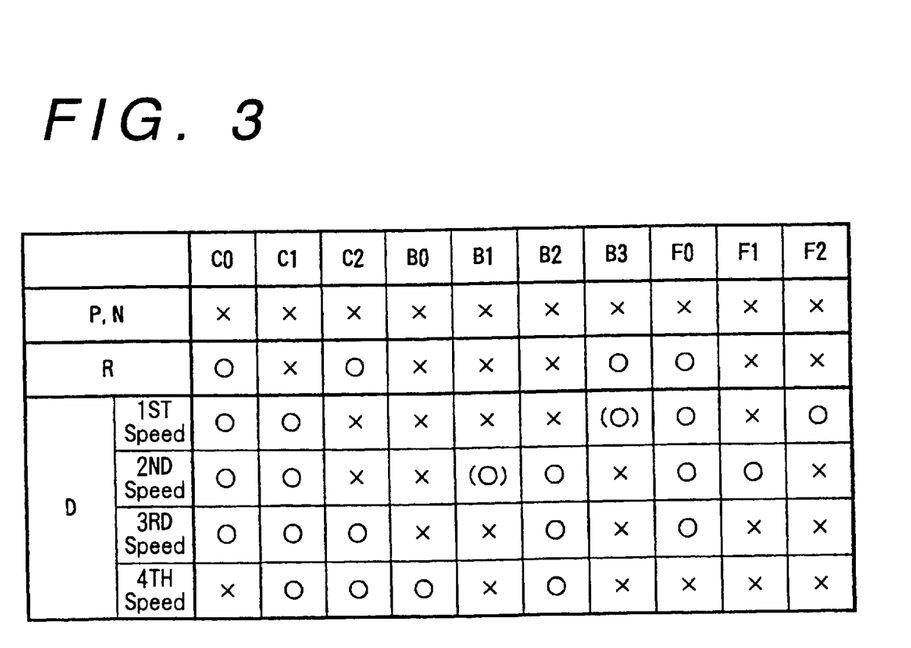
FIG. 3 is an application diagram of an automatic transmission in the power train of the aforementioned embodiment.

As tabulated in the application diagram of FIG. 3, the automatic transmission 8 of the vehicular drive unit is operated by applying/releasing the clutches C0 to C2, the brakes B0 to B3 and the one-way clutches F0 to F2. The individual engagement elements are selected according to the individual range positions "P", "N", "R" and "D" selected. In the table, symbols (O) indicate the applied states of the individual clutches and brakes and the locked states of the one-way clutches, and symbols X indicate the released states of the individual clutches and brakes and the idling states of the one-way clutches. The table in FIG. 3 does not indicate the "2" range separately. In this range, however, the 2ND and 1ST speeds are achieved, and the applied states, as indicated by parenthesized symbols (O), are added so that engine braking can be achieved.

In the system thus far described, according to the subject of the invention, the electric oil pump is controlled, as will be described below. The displacement of the oil pump 83 is reduced to such a small value that the outputs of a line pressure and a lubrication pressure are achieved at the maximum discharge time, i.e., during operation at the maximum RPM, with desired outputs set by considering the leakages from the hydraulic circuit and from the individual portions of the mechanisms to be lubricated.

The electric oil pump control comprises a start control, a start run control and a reverse control so that the lubrication of the transmission is ensured and the power consumption is reduced, thereby contributing to the fuel economy. The fundamental modes of oil pump control are described below:

Start Control

Figure 6:
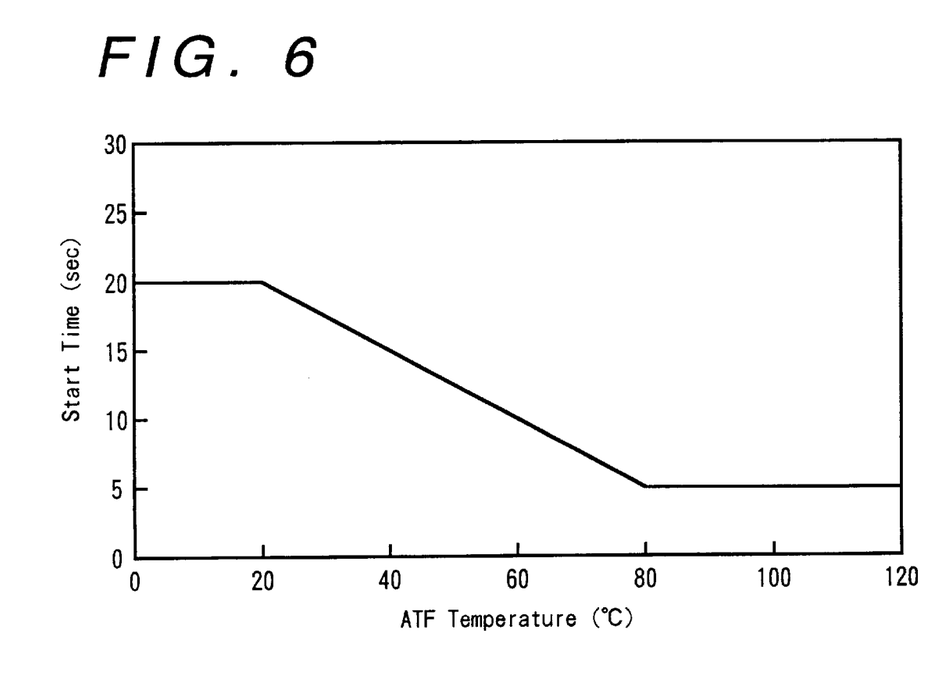
FIG. 6 is an electric oil pump start time map to be used in the aforementioned start control.

In start control, the ignition switch 4 is first turned ON to set an oil pump RPM $N_{OP}$ to an initial start RPM (e.g., 1,500 rpm) that results in output of a sufficient lubrication pressure. This setting is held for a predetermined time (e.g., about 5 to 20 secs) to distribute the lubricating oil quickly into the entire transmission. The hold time of the oil pump start RPM is controlled as a function of the temperature of the automatic transmission working oil (ATF) at the starting time and in accordance with map data representing the relationship between the ATF temperature and the starting time, as illustrated in FIG. 6. If the ATF temperature is high (e.g., 80° C. or more), it is seen that the lubricating oil has already been distributed into the entire transmission when the vehicle starts after a sufficient warm-up. Therefore, the hold time is shortened to reduce the power consumption. After this, the shift input from the shift position sensor 7 is monitored by a timer (e.g., about 2 secs). Without any input, the oil pump RPM $N_{OP}$ is lowered to a value (e.g., 500 rpm) at the engine idling time of an ordinary automatic transmission. At the lowered value, the creep force of the vehicle is established by the engagement of the frictional engagement element at the time of shifting to the drive range. Therefore, the oil pump is changed from a start state into a standby state for reducing the power consumption.

Start Run Control

Figure 8:
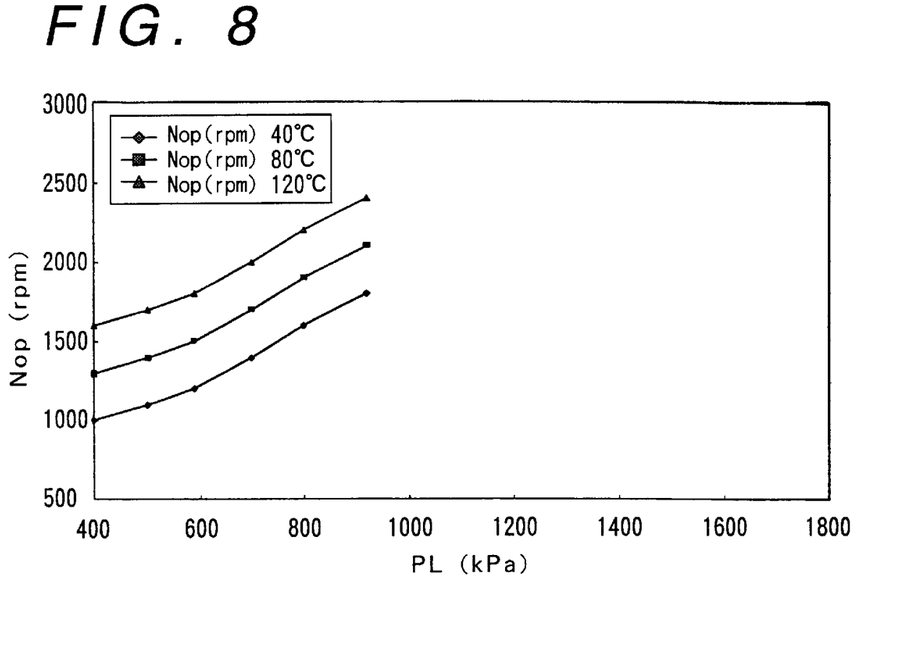
FIG. 8 is a fundamental control map before a cutback to be used in the aforementioned start run control.
Figure 9:
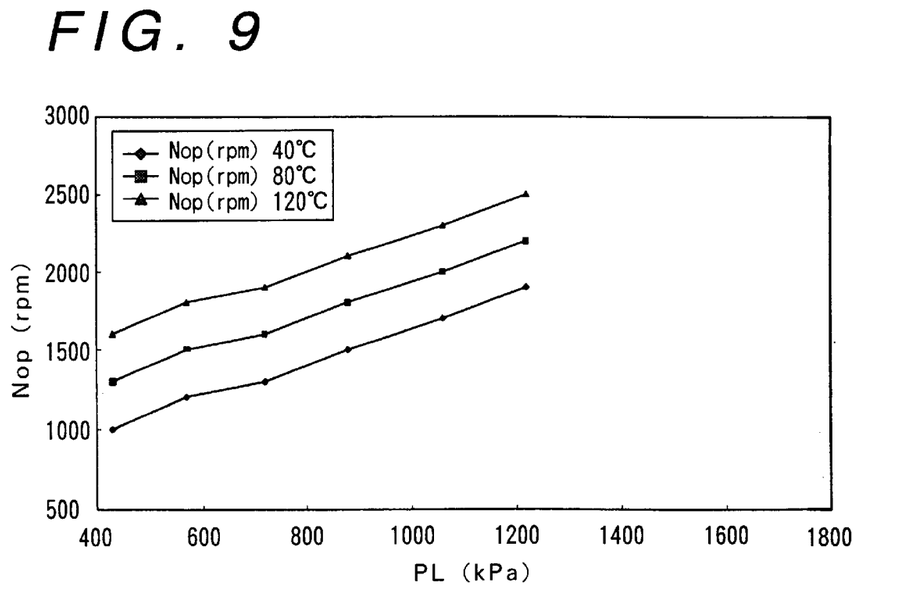
FIG. 9 is a fundamental control map after a cutback to be used in the aforementioned start run control.

Start run control is started at a vehicle stop condition, i.e., during a neutral to drive (N→D) shift with a vehicle speed V=0 Km/h, and the oil pump RPM $N_{OP}$ is set to produce a line pressure RPM (e.g., 800 rpm) capable of producing only a line pressure $P_L$ necessary to establish the start preparing state even if the accelerator pedal is depressed deeply from an accelerator OFF state. After the accelerator ON, a line pressure matching the input torque, as determined by using the oil temperature as a parameter, is produced, and lubrication of the transmission is achieved throughout all the regions in accordance with the oil pump fundamental control map, as illustrated in FIG. 8 or 9. At the low speed coast (e.g., V≦30 Km/h) and the accelerator OFF, or at the stop in the drive range, the oil pump RPM $N_{OP}$ is set to the line pressure value (=800 rpm) so that the low speed lubrication pressure output is not produced, as in the automatic transmission of the prior art, thereby reducing the power consumption. When the accelerator is not ON after lapse of the timer (=2 secs) after the D→N shift, the oil pump RPM $N_{OP}$ is set to a minimum value (=500 rpm) to establish a standby state for reducing the power consumption. At the D→N shift time during a run, however, the standby state is not achieved.

Reverse Control

Figure 11:
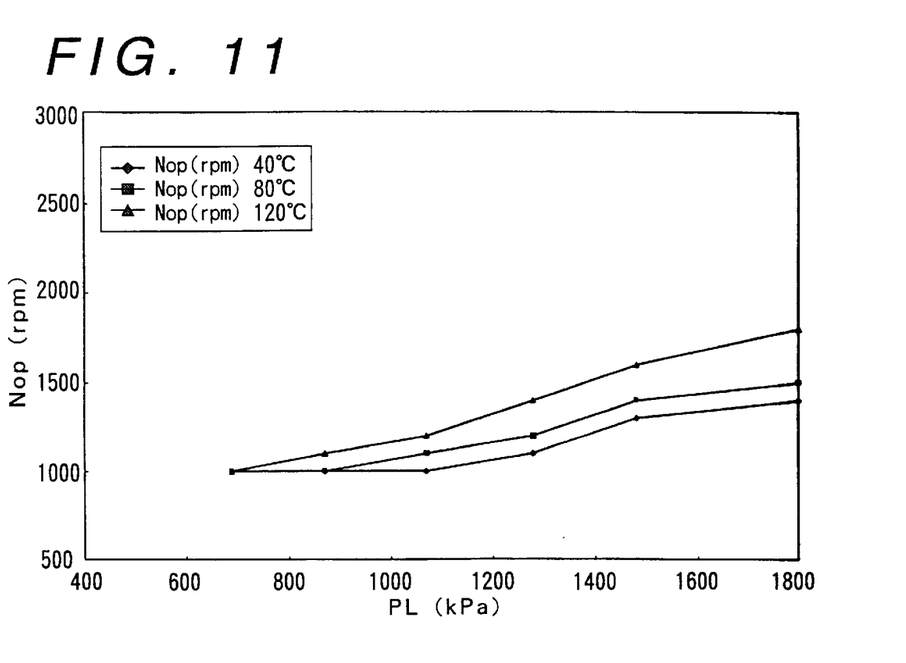
FIG. 11 is a reverse control map of a low vehicle speed mode to be used in the aforementioned reverse control.
Figure 12:
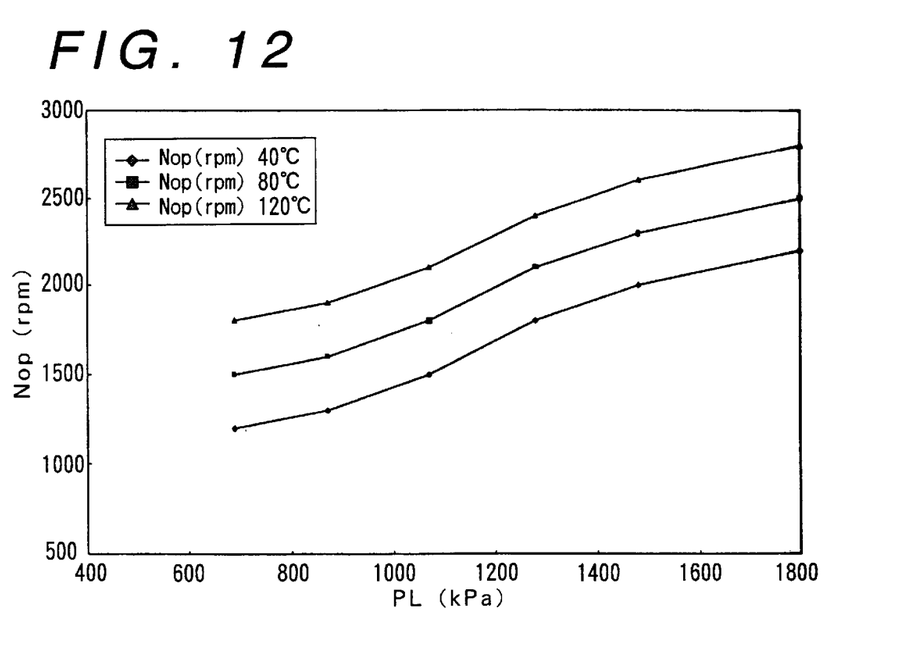
FIG. 12 is a reverse control map of a high vehicle speed mode to be used in the aforementioned reverse control.

Reverse control is essentially identical to the aforementioned start run control with the oil pump RPM $N_{OP}$ being set in the N→D shift such that the line pressure RPM =800 rpm. When the "R" range is detected, the RPM control is made to follow the oil pump reverse control map, as illustrated in FIG. 11. In this case, at a low vehicle speed, the line pressure output is produced, but not lubrication pressure, in order to reduce the power consumption. If the vehicle speed V is high (V >20 Km/h) even at the time of detecting the "R" range, the RPM control is made to follow the oil pump fundamental control map of a high vehicle speed case, as illustrated in FIG. 12, to produce the output of the lubrication pressure as well.

Figure 4:
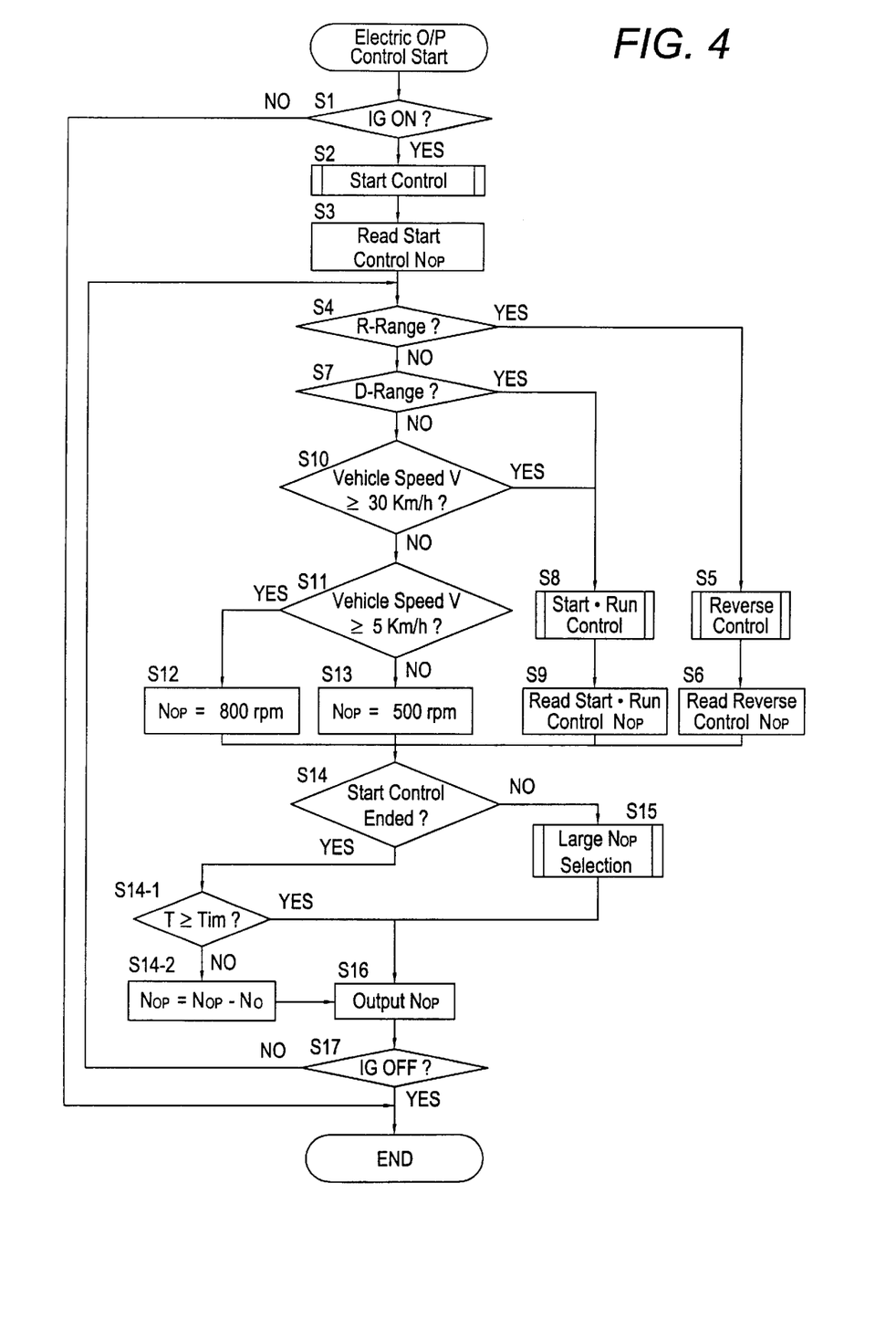
FIG. 4 is a flow chart showing a main flow of an electric oil pump control of the aforementioned embodiment.

FIG. 4 shows a flow chart to be executed by combining those individual controls. In this control routine, the start control of Step S2 is executed in preference to the remaining controls. After the end of this execution, the control routine is based upon the executions of different controls of Steps S5, S8, S12 and S13. The control flow will be separately described in accordance with the running procedure usually anticipated.

Figure 5:
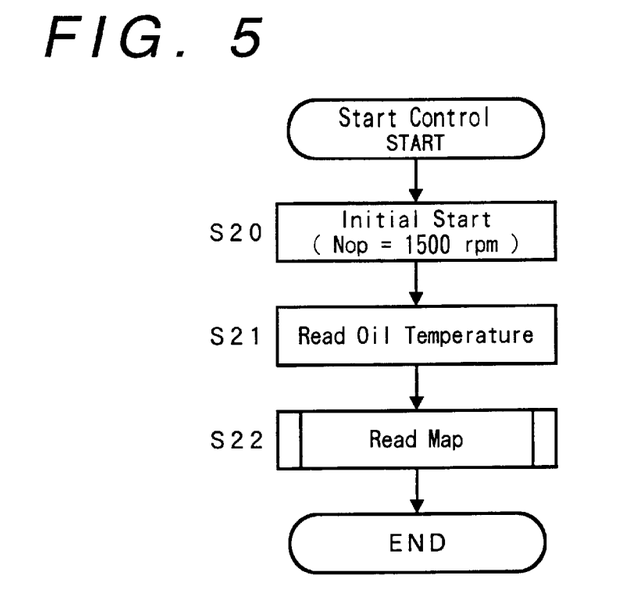
FIG. 5 is a flow chart of a start control sub-routine in the aforementioned main flow.

First of all, the run start of the vehicle is determined at Step S1 by inspecting whether or not the ignition switch is ON. If this answer is (No), the loop is ended without entering into the subsequent individual Steps. If the answer is (Yes), the start control sub-routine is entered at Step S2 to lubricate the entire power transmission. FIG. 5 is a flow chart showing this start control sub-routine, in which the initial start RPM (=1,500 rpm) is set at Step S20. Next, the ATF oil temperature is read at Step S21 from the input of the oil temperature sensor 5. Then, at Step S22, the initial start time is read from the map data, as illustrated in FIG. 6, to set the timer (=5 to 20 secs). Next, reverting to FIG. 4, the oil pump RPM $N_{OP}$, as determined in the start control, is read and stored at Step S3. At Step S4 and later, the range, as selected at present, is inspected by the shift position sensor 7. In this case, the state is before the run, and the "P" or "N" range is usually selected, and the vehicle is in the stop state. Hence, any answer of the subsequent Steps S4, S7, S10 and S11 is (No), but the oil pump RPM $N_{OP}$ is then set at Step S13 to the minimum RPM (=500 rpm). In this loop, the answer of the start control end of next Step S14 is (No), and the higher oil pump start RPM $N_{OP}$ (=1,500 rpm), as set in the start control sub-routine by the operation of Step S15, is outputted at Step S16. If the answer of the ignition switch OFF of Step S17 is (No), the loop starting with Step S4 is repeated.

If the timer, as set by the start control sub-routine, is elapsed by repeating that loop so that the answer of the start control end determination of Step S14 is (Yes), the oil pump RPM $N_{OP}$ at the minimum value (=500 rpm) is outputted at Step S16. If the shift to the running range is not made for a predetermined time $T_{im}$ (e.g., 2 secs) from the next loop, the rotation of the motor 84 is lowered at a predetermined rate No (e.g., 200 rpm/sec) to the minimum value (=500 rpm) so that the RPM is lowered from the oil pump start state to the standby state for reducing the power consumption to await the shift signal input. However, if the shift is made to the running range before the predetermined lapse of time, or within the aforementioned time (i.e., 2 secs), the control is instantly changed to that matching the shift either without lowering the RPM to the aforementioned standby state or in the course of the lowering treatment.

Figure 7:
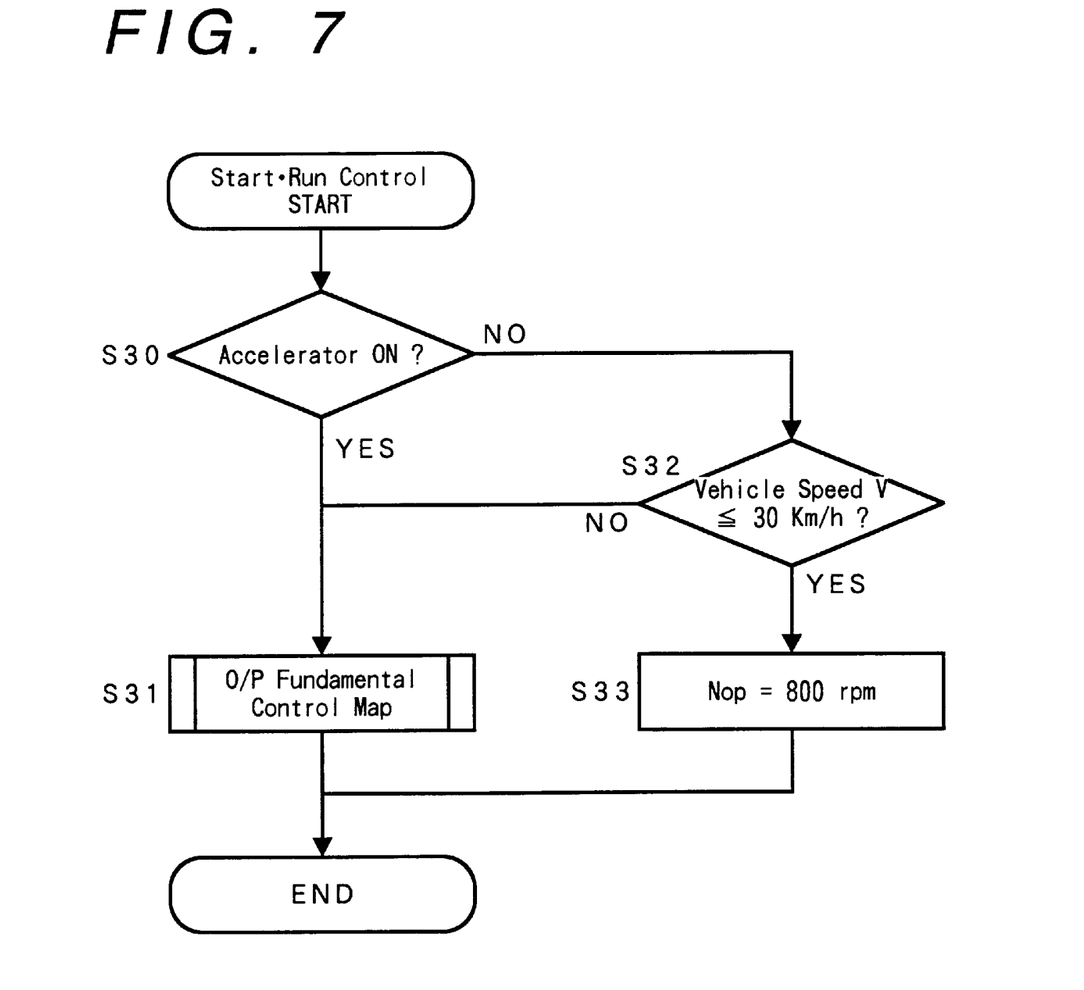
FIG. 7 is a flow chart of a start run control sub-routine in the aforementioned main flow.

If the driver makes a shift to the "D" range with an intention of a running start, the D-range determination holds (yes) at Step S7, and the routine is transferred to the start run control sub-routine of Step S8. FIG. 7 shows this start run control sub-routine, in which it is determined at Step S30 by the accelerator sensor (in terms of the throttle opening, as inputted from the engine control computer, in the present mode) whether the accelerator pedal is depressed. If the answer of the accelerator ON is (Yes), the RPM of the oil pump 84 according to the acceleration data (e.g., the input torque in the present mode) is set from the oil pump fundamental control map, as illustrated in FIGS. 8 and 9. As illustrated in FIG. 8, the oil pump fundamental control map is preset so as to achieve an oil pressure (i.e., the line pressure $P_L$) matching an input torque and a sufficient lubrication pressure by using the ATF oil temperature as its parameter. In this mode, anticipating the case in which a cutback pressure is inputted at a high speed stage (e.g., 3RD speed or more), there are set two maps, i.e., the map before the cutback (BCB) as in FIG. 9, and the map after the cutback (ACB), as illustrated in FIG. 8. If the answer of the accelerator ON at Step S30 is (No), it is determined at Step S32 whether the vehicle speed is low (≦30 Km/h). If this answer is (No) at a high speed, the routine enters Step S31, at which a sufficient lubrication pressure is enabled. If the answer is (Yes) at a low speed (=30 Km/h or less), it is not necessary to provide the lubrication pressure. Therefore, in order to reduce the power consumption, the oil pump RPM is set to a relatively low value (=800 rpm) for producing the line pressure at step S33. This RPM has a value capable of producing the line pressure matching the input torque even just after the accelerator is switched from OFF to ON but incapable of outputting the lubrication pressure sufficiently. In this state, the line pressure can be outputted to hold the engagement of the brake B1 or B3 for retaining the reaction element to achieve engine braking, so that the coast torque can be transmitted.

When the oil pump RPM $N_{OP}$ is thus set, the oil pump RPM $N_{OP}$, as determined for the start run control, is read and stored at next Step S9, as shown in FIG. 4. Since, in this case, the answer of the start control end of next Step S14 is (Yes), the stored oil pump RPM $N_{OP}$ is outputted as it is at Step S16. If it is confirmed at Step S17 that the ignition switch is ON, the routine is returned to Step S4 to repeat the control. This loop is continued until the answer of the determination of the D-range at S7 is (No).

Figure 10:
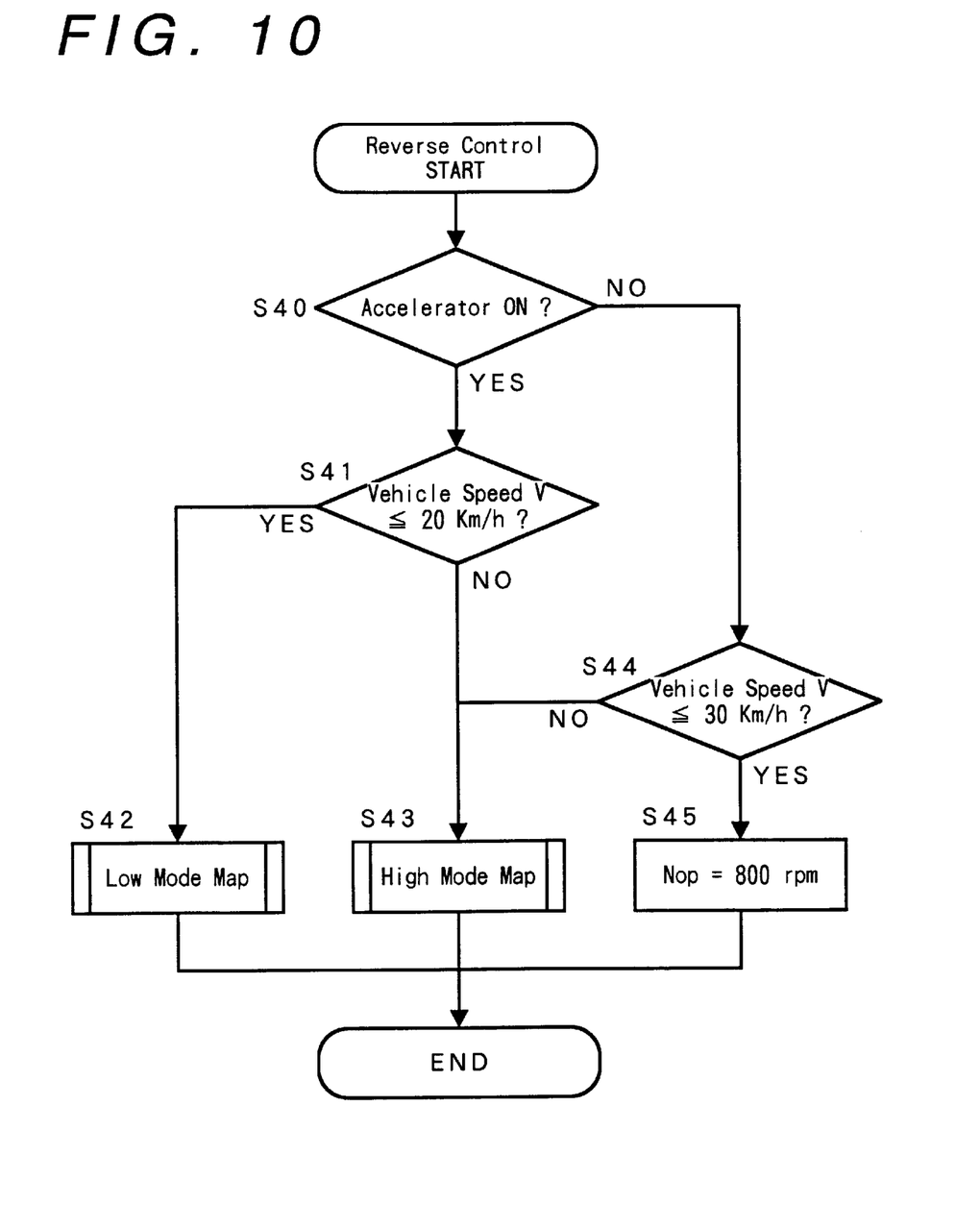
FIG. 10 is a flow chart of a reverse control sub-routine in the aforementioned main flow.

If the driver makes a shift to the "R" range with an intention of reverse operation, the answer of the determination of the R-range is (Yes), and the routine transfers to the reverse control sub-routine of Step S5. FIG. 10 shows this reverse control sub-routine, in which it is determined at Step S40 from the acceleration data whether the accelerator pedal is depressed. If the answer of this accelerator ON determination is (Yes), it is determined at Step S41 from the input of the vehicle speed sensor 6 whether the vehicle speed at the reverse time is lower than or equal to a predetermined level (≦20 Km/h). If the answer of this vehicle speed determination is (Yes), the RPM according to the acceleration data is set at Step S42 by the Lo-mode map, as illustrated in FIG. 11. This Lo-mode map does not indicate sufficient oil pressure for lubrication pressure output at low vehicle speeds, so the RPM is set to a value capable of only producing the line pressure matching the input torque. If the answer of the determination of the low vehicle speed at Step S41 is (No), the RPM matching the acceleration data is set with the Hi-mode map, as illustrated in FIG. 12. In this Hi-mode map, the RPM is set to produce the lubrication oil pressure sufficiently according to the high vehicle speed. The RPM is set to a higher level than that of the Lo-mode map. In the case of the accelerator OFF, in which the answer of the acceleration determination at Step S40 is (No), it is determined at Step S44 for the same reason as that of the "D" range whether or not the vehicle speed V is low (≦30 Km/h). In the case of a low vehicle speed in which the answer is (Yes), the oil pump RPM is set at Step S45 to the line pressure RPM (=800 rpm). In the case of a high vehicle speed, in which the answer is (No), the routine transfers to the aforementioned Step S43, and the RPM is set according to the Hi-mode map for producing the output of the line pressure matching the acceleration data and the output of the lubrication pressure.

When the oil pump RPM $N_{OP}$ is thus set, the oil pump RPM $N_{OP}$, as determined in the aforementioned reverse control, is read and stored at next Step S6, as shown in FIG. 4. In this case, the answer of the start control end determination is (Yes), so the aforementioned stored oil pump RPM $N_{OP}$ is outputted at Step S16. At Step S17, it is confirmed that the ignition is ON, and the routine is returned to Step S4 so that the control is repeated. This loop is continued till the answer of the R-range determination at Step S4 is (No).

When the driver does not shift to the running range but to the non-running range after or during the run, both the answers of the determinations of Steps S4 and S7 are (No), and it is determined that the range belongs to "P" or "N". In this case, it is determined at Step S10 by the vehicle speed sensor whether or not the present vehicle speed is high (V≧30 Km/h), and it is determined at Step S11 whether the vehicle speed is higher than the value (=5 Km/h) indicating that the vehicle is substantially stopped. These vehicle speed determinations assume the case in which the driver shifts the range from "D" to "N" during a run on a downhill, for example. If the answer of the determination of high vehicle speed is (Yes) at Step S10, the routine transfers to the start run control of Step S8, at which the control to be made is identical to that of the "D" range. In addition, if the answer of the high vehicle speed determination at Step S10 is (No) and if the answer of the non-stop determination at Step S11 is (Yes), thus indicating a low vehicle speed run, lubrication pressure output is not especially required, but the line pressure RPM (=800 rpm) is read and stored. In the ordinary case in which both the answers of the determinations of Steps S10 and S11 are (No), it is determined that the vehicle is stopped, and the low RPM (=500 rpm) is read and stored at Step S13 so as to make preparations for reducing the power consumption of the electric oil pump and the shift to the "D" or "R" range. In this case, the answer of the start control end determination at next Step S14 is (Yes), and the aforementioned stored oil pump RPM $N_{OP}$ is outputted at Step S16. Then, it is confirmed at Step S17 that the ignition switch is ON, and the routine is returned to Step S4, at which the control is repeated. This loop is continued till the answers of the determinations at the preceding Steps S4 and S7 are (Yes).

Thus, if the answer of the determination at Step S14 is (Yes) for each control loop, the RPMs, as stored at the individual Steps S6, S9, S12 and S13, are outputted at Step S16. If the answer of the determination at Step S14 is (No), the RPM, as selected at Step S15, is outputted. Specifically, at Step S15 in preference to the start control, the maximum (i.e., the RPM stored at Step S3 in this case) is selected from the RPMs stored at Steps S3, S6, S9, S12 and S13. The controls thus far made are ended at the ignition switch OFF.

Thus, according to the embodiment thus far described, the power consumption, as required for driving the oil pump, can be reduced to the least amount possible while properly maintaining the control of the power transmission and the cooling lubricating oil pressure output in accordance with the individual running situations of the vehicle.

Although the invention has been described in detail in connection with its one embodiment, it can be practiced by modifying its detailed specific structure in various manners within the scope of the individual claims.

What is claimed is:

1. An electric oil pump control system for a vehicular power transmission comprising:

an oil pump for producing oil pressure for a line pressure to control the applications of frictional engagement elements and for a lubrication pressure to lubricate individual mechanical portions of said power transmission;

a motor for driving said oil pump;

a control unit for said motor; and an accelerator sensor for inputting acceleration data according to the operation of an accelerator pedal of a vehicle to said control unit, wherein said control unit controls the revolutions per minute of said motor such that an amount of oil discharged by said oil pump is sufficient for outputting a line pressure and the lubrication pressure matching the acceleration data and said control unit determines a coast state of the vehicle from the acceleration data and consequently controls the revolutions per minute of said motor so that the amount of oil discharged from said oil pump is at least sufficient for outputting the line pressure matching the acceleration data.

2. The electric oil pump control system for a vehicular power transmission according to claim 1, further comprising a vehicle speed sensor for inputting a running speed of the vehicle to said control unit, wherein said control unit controls the revolutions per minute of said motor, during the coast state and when said vehicle speed sensor inputs a running speed greater than or equal to a predetermined vehicle speed, so that the amount of oil discharged from said oil pump is sufficient for outputting the line pressure matching the acceleration data and the lubrication pressure.

3. The electric oil pump control system for a vehicular power transmission according to claim 1, further comprising a shift position sensor for inputting a range position of said power transmission to said control unit, wherein said control unit controls the revolutions per minute of said motor, when the range position is reverse, so that the amount of oil discharged from said oil pump is only sufficient for outputting the line pressure matching the acceleration data.

4. The electric oil pump control system for a vehicular power transmission according to claim 3, further comprising a vehicle speed sensor for inputting a running speed of the vehicle to said control unit, wherein said control unit controls the revolutions per minute of said motor, when the vehicle is operated in reverse at a vehicle speed higher than a predetermined speed, so that the amount of oil discharged from said oil pump is sufficient for outputting the line pressure matching the acceleration data and the lubrication pressure.

5. An electric oil pump control system for a vehicular power transmission, comprising:

an oil pump for producing oil pressure for a line pressure to control the applications of frictional engagement elements and for a lubrication pressure to lubricate individual mechanical portions of said power transmission;

a motor for driving said oil pump;

a control unit for said motor;

an accelerator sensor for inputting acceleration data according to the operation of an accelerator pedal of a vehicle to said control unit; and a shift position sensor for inputting a range position of said power transmission to said control unit, wherein said control unit controls the revolutions per minute of said motor such that an amount of oil discharged by said oil pump is sufficient for outputting a line pressure and the lubricating pressure matching the acceleration data, and, at a vehicle stop in a running range, irrespective of the acceleration data inputted, so that the amount of oil discharged from said oil pump is only sufficient for outputting a line pressure in preparation for start of the vehicle.

6. The electric oil pump control system for a vehicular power transmission according to claim 1, further comprising: a shift position sensor for inputting a range position of said power transmission to said control unit; and a vehicle speed sensor for inputting a running speed of the vehicle, wherein said control unit controls the revolutions per minute of said motor, at a stop in the non-running range, irrespective of the acceleration data inputted, so that the amount of oil discharged from said oil pump is only sufficient for outputting a line pressure to allow shifting to a running range in preparation for starting acceleration.

7. An electric oil pump control system for a vehicular power transmission, comprising:

an oil pump for producing oil pressure for a line pressure to control the applications of frictional engagement elements and for a lubrication pressure to lubricate individual mechanical portions of said power transmission;

a motor for driving said oil pump;

a control unit for said motor;

an accelerator sensor for inputting acceleration data according to the operation of an accelerator pedal of a vehicle to said control unit;

an ignition switch for inputting an on/off data of a power source circuit of the vehicle to said control unit; and an oil temperature sensor for inputting a temperature of oil in said power transmission to said control unit, wherein said control unit controls the revolutions per minute of said motor such that an amount of oil discharged by said oil pump is sufficient for outputting a line pressure and the lubrication pressure matching the acceleration data, and said control unit rotates said motor at a speed at which an amount of oil discharged by said oil pump is sufficient for outputting the lubrication pressure, when said ignition switch is turned on, for a predetermined time period according to the oil temperature and lowers the revolutions per minute of said motor at a predetermined rate over a predetermined period of time, to a value at which an amount of oil produced by said oil pump is only sufficient for outputting a line pressure matching the acceleration data.

8. An electric oil pump control system for a vehicular power transmission, comprising:

an oil pump for producing oil pressure for a line pressure to control the applications of frictional engagement elements and for a lubrication pressure to lubricate individual mechanical portions of said power transmission;

a motor for driving said oil pump;

a control unit for said motor;

an accelerator sensor for inputting acceleration data according to the operation of an accelerator pedal of a vehicle to said control unit: and an oil temperature sensor for inputting a temperature of oil in said power transmission to said control unit, wherein said control unit controls the revolutions per minute of said motor such that an amount of oil discharged by said oil pump is sufficient for outputting a line pressure and the lubrication pressure matching the acceleration data, and said control unit changes the revolutions per minute of said motor in accordance with the oil temperature.

* * * * *